United States Patent
Gautam et al.

(10) Patent No.: US 10,862,797 B2
(45) Date of Patent: Dec. 8, 2020

(54) CONTROL AND DATA PLANE SYNCHRONIZATION DURING MAKE BEFORE BREAK OPERATIONS IN MULTIPROTOCOL LABEL SWITCHING

(71) Applicant: Ciena Corporation, Hanover, MD (US)

(72) Inventors: Vineet Gautam, Delhi (IN); Sudarshan Sodhani, Gurgaon (IN); Ritesh Singal, Gurgaon (IN); Piyush Sharma, Gurgaon (IN)

(73) Assignee: Ciena Corporation, Hanover, MD (US)

(*) Notice: Subject to any disclaimer, the term of this patent is extended or adjusted under 35 U.S.C. 154(b) by 0 days.

(21) Appl. No.: 16/237,859

(22) Filed: Jan. 2, 2019

(65) Prior Publication Data

US 2020/0162374 A1    May 21, 2020

(30) Foreign Application Priority Data

Nov. 19, 2018   (IN) ............................. 201811043499

(51) Int. Cl.
| | | |
|---|---|---|
| *H04L 12/723* | (2013.01) | |
| *H04L 12/911* | (2013.01) | |
| *H04L 12/26* | (2006.01) | |
| *H04L 12/46* | (2006.01) | |

(52) U.S. Cl.
CPC .......... *H04L 45/50* (2013.01); *H04L 43/0876* (2013.01); *H04L 43/10* (2013.01); *H04L 47/825* (2013.01); *H04L 12/4633* (2013.01)

(58) Field of Classification Search
CPC . H04L 12/4633; H04L 43/0876; H04L 43/10; H04L 45/50; H04L 47/825; H04L 45/28
See application file for complete search history.

(56) References Cited

U.S. PATENT DOCUMENTS

| | | | |
|---|---|---|---|
| 6,996,110 B1 * | 2/2006 | Amara | ................ H04L 12/4633 370/389 |
| 8,897,140 B1 | 11/2014 | Bhattacharya | |
| 9,800,325 B1 | 10/2017 | Skalecki et al. | |
| 10,341,228 B1 * | 7/2019 | Boyapati | ............... H04L 47/724 |
| 2009/0190487 A1 * | 7/2009 | Breslau | ............... H04L 12/4633 370/252 |
| 2012/0182990 A1 * | 7/2012 | Cao | ......................... H04L 45/50 370/389 |

(Continued)

*Primary Examiner* — Asad M Nawaz
*Assistant Examiner* — Kai Chang
(74) *Attorney, Agent, or Firm* — Clements Bernard Walker; Lawrence A. Baratta, Jr.; Christopher L. Bernard (57) ABSTRACT

Systems and methods include, in a first Label Edge Router (LER) in a Multiprotocol Label Switching (MPLS) network, creating a primary tunnel with a second LER; creating a Make Before Break (MBB) tunnel with the second LER for the primary tunnel; prior to switching to the MBB tunnel from the primary tunnel, sending an MPLS request to the second LER via the MBB tunnel and receiving an MPLS response from the second LER via the MBB tunnel indicating successfully creation of the MBB tunnel; switching to the MBB tunnel responsive to the successfully creation of the MBB tunnel; and, prior to tearing down the primary tunnel, checking statistics of the MBB tunnel to ensure traffic has moved to the MBB tunnel from the primary tunnel.

14 Claims, 8 Drawing Sheets

(56) References Cited

U.S. PATENT DOCUMENTS

| | | | |
|---|---|---|---|
| 2013/0336108 A1* | 12/2013 | Vasseur | H04L 41/0663 |
| | | | 370/225 |
| 2014/0003322 A1* | 1/2014 | Grinshpun | H04W 36/026 |
| | | | 370/312 |
| 2015/0222557 A1 | 8/2015 | Bhattacharya | |
| 2016/0105380 A1 | 4/2016 | Chhillar et al. | |
| 2017/0099354 A1 | 4/2017 | Moynihan et al. | |
| 2017/0111268 A1* | 4/2017 | Swallow | H04L 45/74 |
| 2017/0317953 A1 | 11/2017 | Sareen et al. | |
| 2018/0191621 A1* | 7/2018 | Karthikeyan | H04L 47/2425 |
| 2019/0132151 A1* | 5/2019 | Xue | H04L 12/4633 |
| 2019/0268815 A1* | 8/2019 | Zhu | H04W 76/12 |

* cited by examiner

CONTROL AND DATA PLANE SYNCHRONIZATION DURING MAKE BEFORE BREAK OPERATIONS IN MULTIPROTOCOL LABEL SWITCHING

FIELD OF THE DISCLOSURE

The present disclosure generally relates to networking. More particularly, the present disclosure relates to systems and methods for control and data plane synchronization during Make Before Break (MBB) operations in Multiprotocol Label Switching (MPLS).

BACKGROUND OF THE DISCLOSURE

Multiprotocol Label Switching (MPLS) networks generally operate by directing data from one network node to another via short path labels as opposed to long network addresses. MPLS tunnels include Label Switched Paths (LSPs) which are paths through an MPLS network set via signaling (such as through Label Distribution Protocol (LDP), Resource Reservation Protocol-Traffic Engineering (RSVP-TE), Border Gateway Protocol (BGP), etc.). Networks can include a Control Plane (CP) and a Data Plane (DP). The CP is configured to make decisions about where traffic is sent; includes the exchange of control packets or Protocol Data Units (PDUs); performs functionality related to configuration, management, and the exchange of routing information; Operations, Administration, Maintenance (OAM); etc. That is, the CP can be viewed as the signaling aspect of a network. The DP is also known as a forwarding plane and includes forwarding traffic to a next hop along a path to a selected destination, as directed by the CP. The CP in MPLS includes various routing protocols, label distribution protocols, etc.

Additionally, LSPs can be protected such as a primary LSP and a backup LSP. Switchover between the primary and backup LSPs can be via a Make Before Break (MBB) operation which includes establishing the new path before the old path is terminated/switched. In systems where CP-DP interactions are asynchronously handled (e.g., in chassis-based systems), there are coordination issues during the MBB operation which results in a traffic hit which defeats the basic intent of MBB operation's underlying requirement of zero traffic drop. The conventional solution here is a delay-based approach where delay (e.g., timer) is introduced to allow the DP to be synchronized with the CP and configured before any traffic impacting MBB transitions. However, this timer-based approach does not guarantee hitless MBB operations in all scenarios and this is not a scalable solution.

BRIEF SUMMARY OF THE DISCLOSURE

In an embodiment, a method includes, in a first Label Edge Router (LER) in a Multiprotocol Label Switching (MPLS) network, creating a primary tunnel with a second LER; creating a Make Before Break (MBB) tunnel with the second LER for the primary tunnel; prior to switching to the MBB tunnel from the primary tunnel, sending an MPLS request to the second LER via the MBB tunnel and receiving an MPLS response from the second LER via the MBB tunnel indicating successfully creation of the MBB tunnel; switching to the MBB tunnel responsive to the successful creation of the MBB tunnel; and, prior to tearing down the primary tunnel, checking statistics of the MBB tunnel to ensure traffic has moved to the MBB tunnel from the primary tunnel. The method can further include tearing down the primary tunnel responsive to a determination the traffic has moved to the MBB tunnel based on the statistics. The checking statistics can include caching statistics from the primary tunnel prior to the switching, determining new statistics for the MBB tunnel, and comparing the cached statistics with the new statistics to indicate a traffic rate. The traffic can be moved to the MBB tunnel from the primary tunnel based on an indication the new statistics have a similar traffic rate to the cached statistics. The cached statistics and the new statistics can be received Performance Monitoring (PM) data. The checking statistics can be utilized in lieu of signaling messages between the first LER and the second LER to determine the traffic has moved to the MBB tunnel from the primary tunnel. The checking statistics can be utilized in lieu of Resource Reservation Protocol (RSVP) signaling messages.

In another embodiment, a Label Edge Router (LER) includes a plurality of ports; a switching fabric communicatively coupling the plurality of ports; and a controller configured to control the plurality of ports and the switching fabric to create a primary tunnel with a second LER, create a Make Before Break (MBB) tunnel with the second LER for the primary tunnel, prior to switching to the MBB tunnel from the primary tunnel, send an MPLS request to the second LER via the MBB tunnel and determine reception of an MPLS response from the second LER via the MBB tunnel indicating successfully creation of the MBB tunnel, switch to the MBB tunnel responsive to the successful creation of the MBB tunnel, and, prior to tearing down the primary tunnel, check statistics of the MBB tunnel to ensure traffic has moved to the MBB tunnel from the primary tunnel. The controller can be configured to control the plurality of ports and the switching fabric to tear down the primary tunnel responsive to a determination the traffic has moved to the MBB tunnel based on the statistics. The statistics can be checked by the controller through a cache of statistics from the primary tunnel prior to the switch, a determination of new statistics for the MBB tunnel, and a comparison of the cached statistics with the new statistics to indicate a traffic rate. The traffic can be moved to the MBB tunnel from the primary tunnel based on an indication the new statistics have a similar traffic rate to the cached statistics. The cached statistics and the new statistics can be received Performance Monitoring (PM) data. The statistics can be checked by the controller through instead of signaling messages between the first LER and the second LER to determine the traffic has moved to the MBB tunnel from the primary tunnel. The checking statistics can be utilized in lieu of Resource Reservation Protocol (RSVP) signaling messages.

In another embodiment, a Multiprotocol Label Switching (MPLS) network includes a plurality of nodes which include at least a first Label Edge Router (LER) and a second LER; wherein a primary tunnel is created between the first LER and the second LER; wherein a Make Before Break (MBB) tunnel is created between the first LER and the second LER for the primary tunnel; wherein, prior to switching to the MBB tunnel from the primary tunnel, the first LER sends an MPLS request to the second LER via the MBB tunnel and receives an MPLS response from the second LER via the MBB tunnel indicating successfully creation of the MBB tunnel; wherein the first LER switches to the MBB tunnel responsive to the successful creation of the MBB tunnel; and wherein, prior to tearing down the primary tunnel, the first LER checks statistics of the MBB tunnel to ensure traffic has moved to the MBB tunnel from the primary tunnel. The primary tunnel can be torn down responsive to a determination the traffic has moved to the MBB tunnel based on the statistics. The statistics an be checked through a cache of statistics from the primary tunnel prior to the switch, a determination of new statistics for the MBB tunnel, and a comparison of the cached statistics with the new statistics to indicate a traffic rate. The traffic can be moved to the MBB tunnel from the primary tunnel based on an indication the new statistics have a similar traffic rate to the cached statistics. The cached statistics and the new statistics can be received Performance Monitoring (PM) data. The statistics can be utilized in lieu of Resource Reservation Protocol (RSVP) signaling messages to determine the traffic has moved to the MBB tunnel from the primary tunnel.

BRIEF DESCRIPTION OF THE DRAWINGS

The present disclosure is illustrated and described herein with reference to the various drawings, in which like reference numbers are used to denote like system components/ method steps, as appropriate, and in which.

DETAILED DESCRIPTION OF THE DISCLOSURE

The present disclosure relates to systems and methods for control and data plane synchronization during Make Before Break (MBB) operations in Multiprotocol Label Switching (MPLS). The systems and methods avoid using a timer or delay-based approach and relies on monitoring Performance Monitoring (PM) data to determine when the DP is synchronized with the CP. As such, MBB operations are performed in an optimal manner while guaranteeing hitless transitions.

The following abbreviations are used herein:

| | |
|---|---|
| CP | Control Plane |
| DCRT | Dynamic Co-Routed LSP |
| DP | Data Plane |
| LSP | Label Switched Path |
| MBB | Make Before Break |
| MPLS | Multiprotocol Label Switching |
| PM | Performance Monitoring |
| TG | Tunnel Group - It contains at most two LSPs (Active and Backup LSP). |
| UNI | Uni-Directional LSP |

Network

Figure 1:
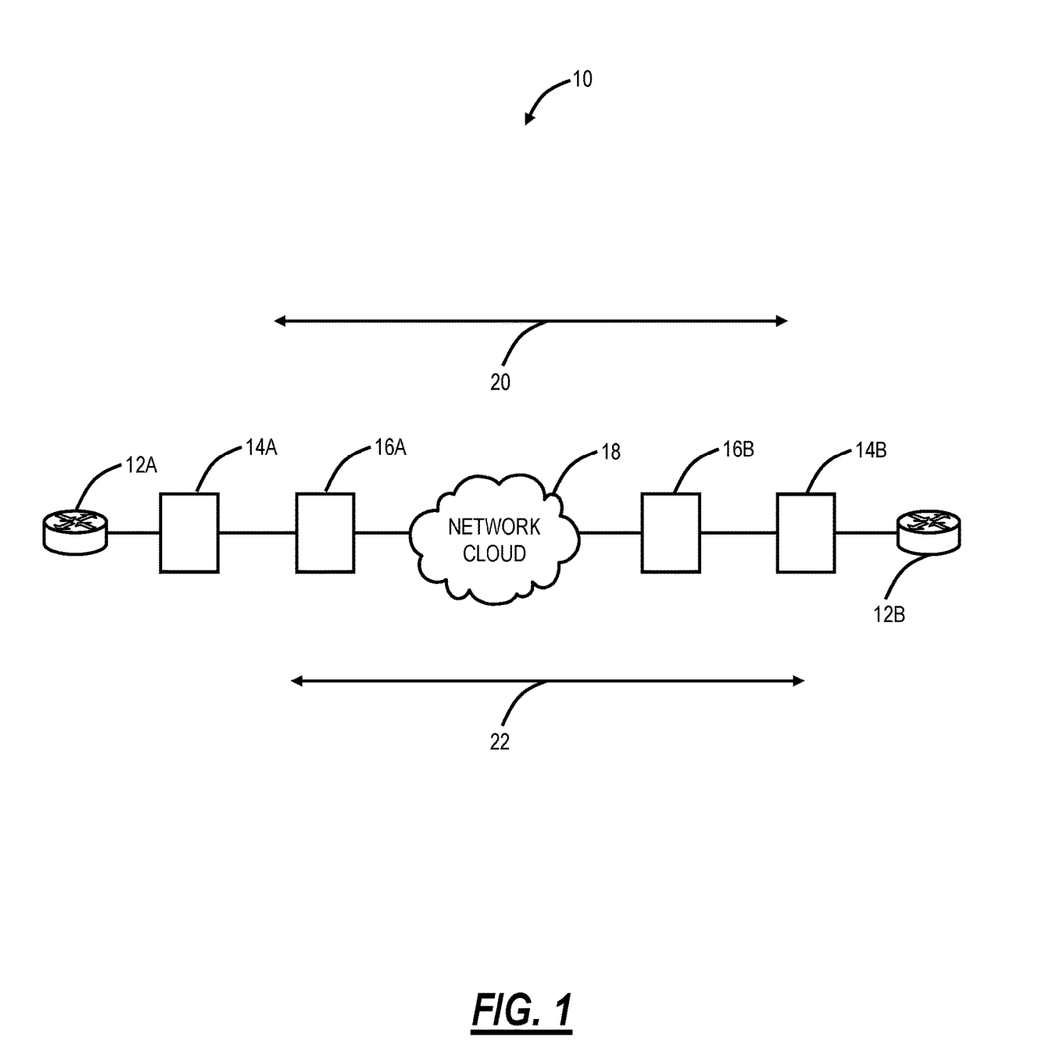
FIG. 1 is a network diagram of an example Multiprotocol Label Switching (MPLS) network.

FIG. 1 is a network diagram of an example MPLS network 10. The MPLS network 10 includes two Customer Premises Equipment (CPE) routers 12A, 12B interconnected through the MPLS network 10. The MPLS network 10 includes network elements 14A, 14B, 16A, 16B as well as other possible network elements/nodes represented by a network cloud 18. In an example, the MPLS network 10 can include a primary LSP 20 and a backup LSP 22 interconnecting the CPE routers 12A, 12B via the network elements 14A, 14B. The network elements 14A, 14B are Label Edge Routers (LER) and the network elements 16A, 16B are Label Switched Routers (LSR).

The MPLS network 10 is presented herein for illustration purposes, and those of ordinary skill in the art will recognize other deployments can include additional network elements, fewer network elements, different topologies, etc. Within the MPLS network 10, each LSR is configured to forward traffic along Label Switched Paths (LSPs) between the LERs. MPLS is used in the MPLS network 10 to reduce the number of lookups performed at the various network elements 14, 16. For example, a packet can be received by the head end LER of an LSP which conventionally performs a lookup to determine which label should be pushed onto the packet to switch the packet onto an LSP to the next hop through the MPLS network 10 to reach its destination. When the packet arrives at intermediary LSRs, the LSR will read the MPLS label and replace the MPLS label with a new MPLS label. MPLS thus allows a single route lookup to be performed at the edge of the MPLS network 10 and allows label switching to be used instead of lookups to forward the packet across the MPLS network 10.

Problem Statement

Figure 2:
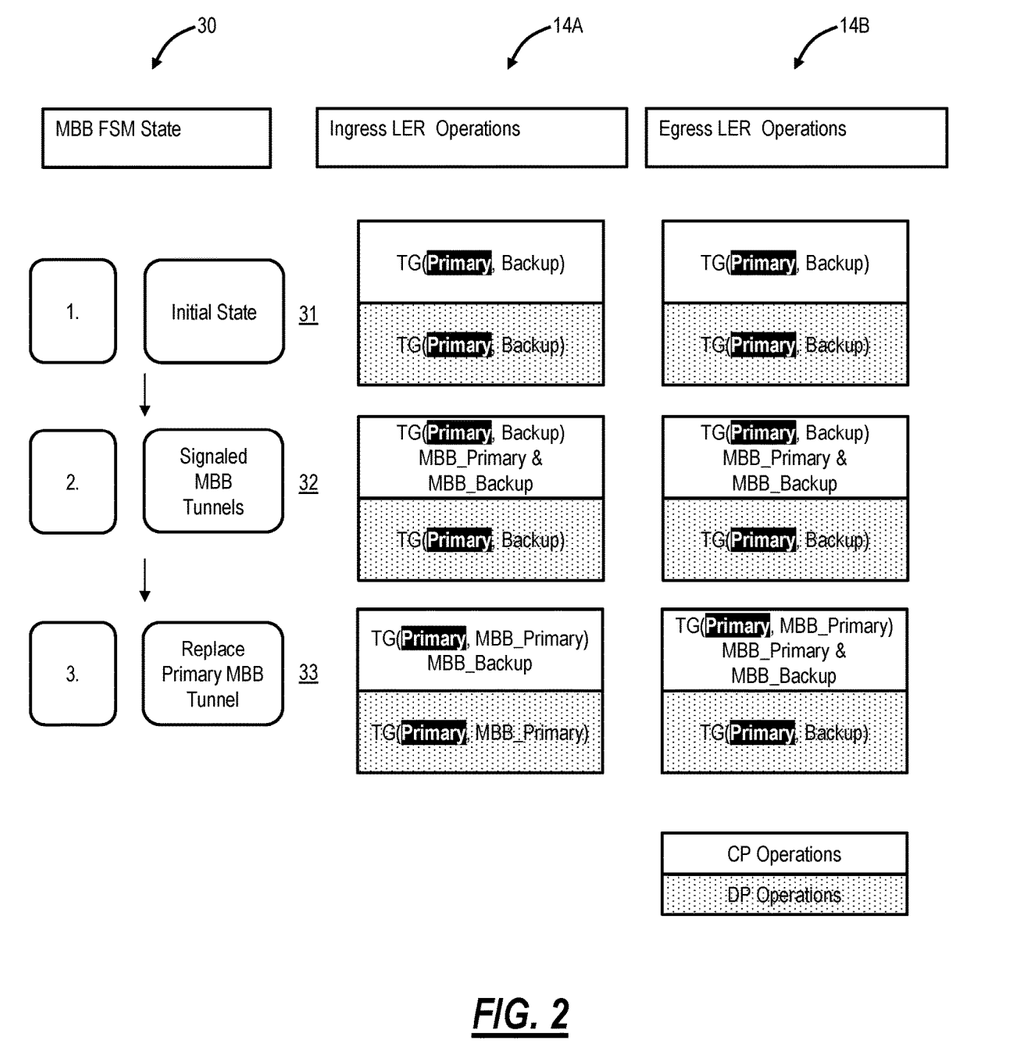
FIG. 2 is a diagram illustrating a Make Before Break (MBB) Finite State Machine (FSM) process at an ingress Label Edge Router (LER) and an egress LER for switching to an MBB Label Switched Path (LSP)

The network elements 14, 16 both have CP and DP operations, and the CP-DP interactions are asynchronously handled. There are two coordination issues that arise in an MBB operation between the LSPs 20, 22. A first issue involves ensuring a switch from the primary LSP 20 to an MBB LSP is only performed when the DP is also programmed on the complete path (including all hops). For example, here, the primary LSP 20 is operational and needs to be switched to the backup LSP which is being set up in an MBB operation. FIG. 2 is a diagram illustrating an MBB Finite State Machine (FSM) process 30 at an ingress LER 14A and an egress LER 14B for switching to an MBB LSP. The MBB FSM state process 30 includes an initial state (step 31), signaling MBB tunnels (step 32), and replacing the primary MBB tunnel (step 33). Note, tunnels are the LSPs 20, 22, e.g., the primary MBB tunnel can be the primary LSP 20.

FIG. 2 includes CP operations and DP operations at each of the ingress LER 14A and the egress LER 14B at each step. At the initial state (step 31), the ingress LER 14A and the egress LER 14B communicate via a TG which includes the primary LSP 20 and the backup LSP 22. This is designated as TG(Primary, Backup) and the highlight of "Primary" indicates the primary LSP 20 is currently carrying traffic, for both the CP and DP operation. When the MBB tunnels are signaled (step 32), the CP operations change to note TG(Primary, Backup, MBB Primary, & MBB Backup) with the highlight of "Primary" indicates the primary LSP 20 is currently carrying traffic. Note, the DP operation remains as TG(Primary, Backup) as the CP and DP are not yet synchronized. Finally, the primary MBB tunnel is replaced (step 33). Here, the CP operation at the ingress LER 14A is TG(Primary, MBB Primary). Of note, at step 33, the DP operation is different between the ingress LER 14A TG(Primary, MBB Primary)) and the egress LER 14B (TG(Primary, Backup). The egress LER 14B has not performed the CP-DP update. If the ingress LER 14A switches to the MBB Primary tunnel, there is a traffic hit as the egress LER 14B has not yet synchronized.

With traffic on the backup LSP 22, a second issue involves ensuring traffic has switched over to an MBB LSP prior to replacing a backup LSP in a TG and tearing down original LSPs (primary and backup). This second issue here is how to ensure that hardware has successfully completed the switchover both on ingress LER 14A and egress LER 14B before tearing the original LSPs.

Figure 3:
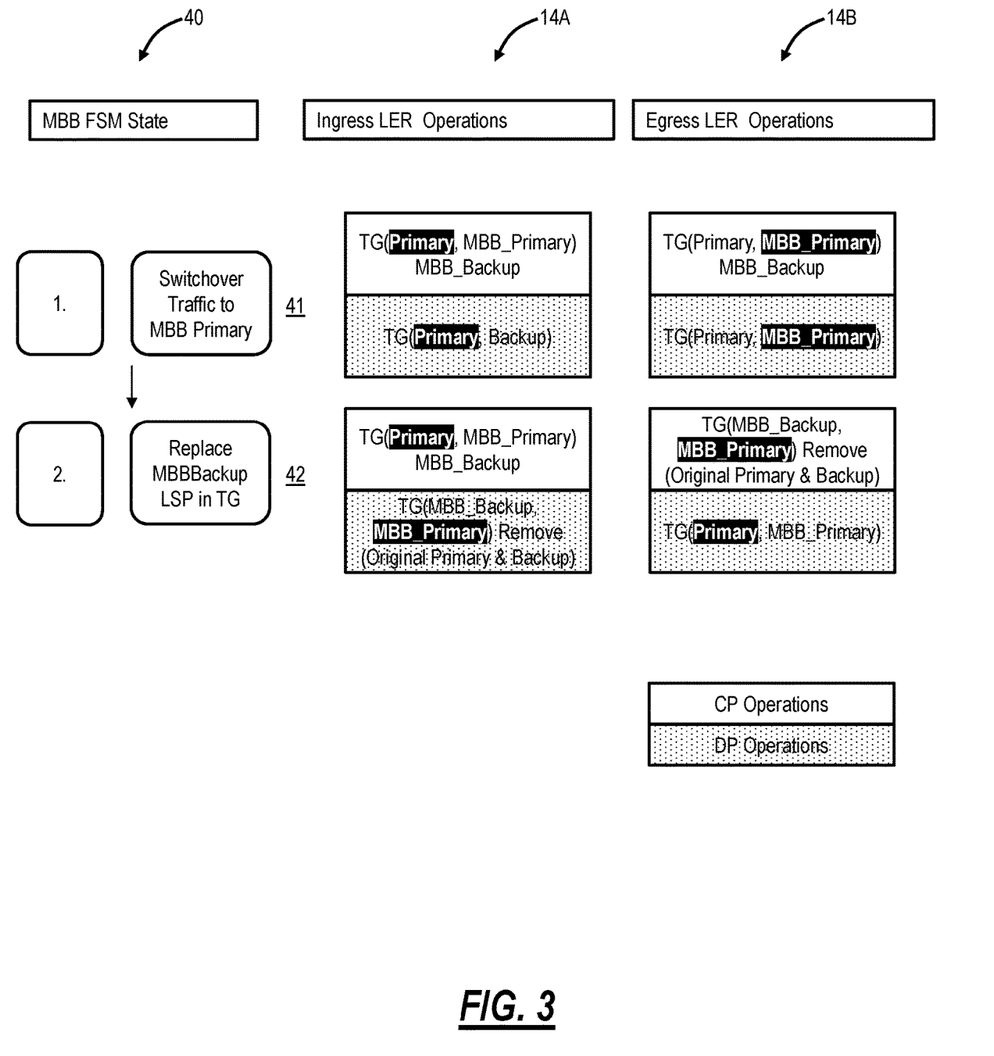
FIG. 3 is a diagram illustrating an MBB FSM process at an ingress LER and an egress LER for replacing a backup LSP in a Tunnel Group (TG)

FIG. 3 is a diagram illustrating an MBB FSM process 40 at an ingress LER 14A and an egress LER 14B for replacing a backup LSP in a TG. The MBB FSM process 40 begins were the MBB FSM process 30 leaves off with a traffic switchover to an MBB primary tunnel (step 41) and replacement of the MBB Backup LSP in the TG (step 42). Now in the highlighted portion, there is a traffic hit since ingress LER 14A performs the traffic switchover first and also removes the original LSPs (Primary and Backup) but the egress LER 14B is still sending traffic on the primary LSP and has not switched over to MBB Primary LSP.

Figure 4:
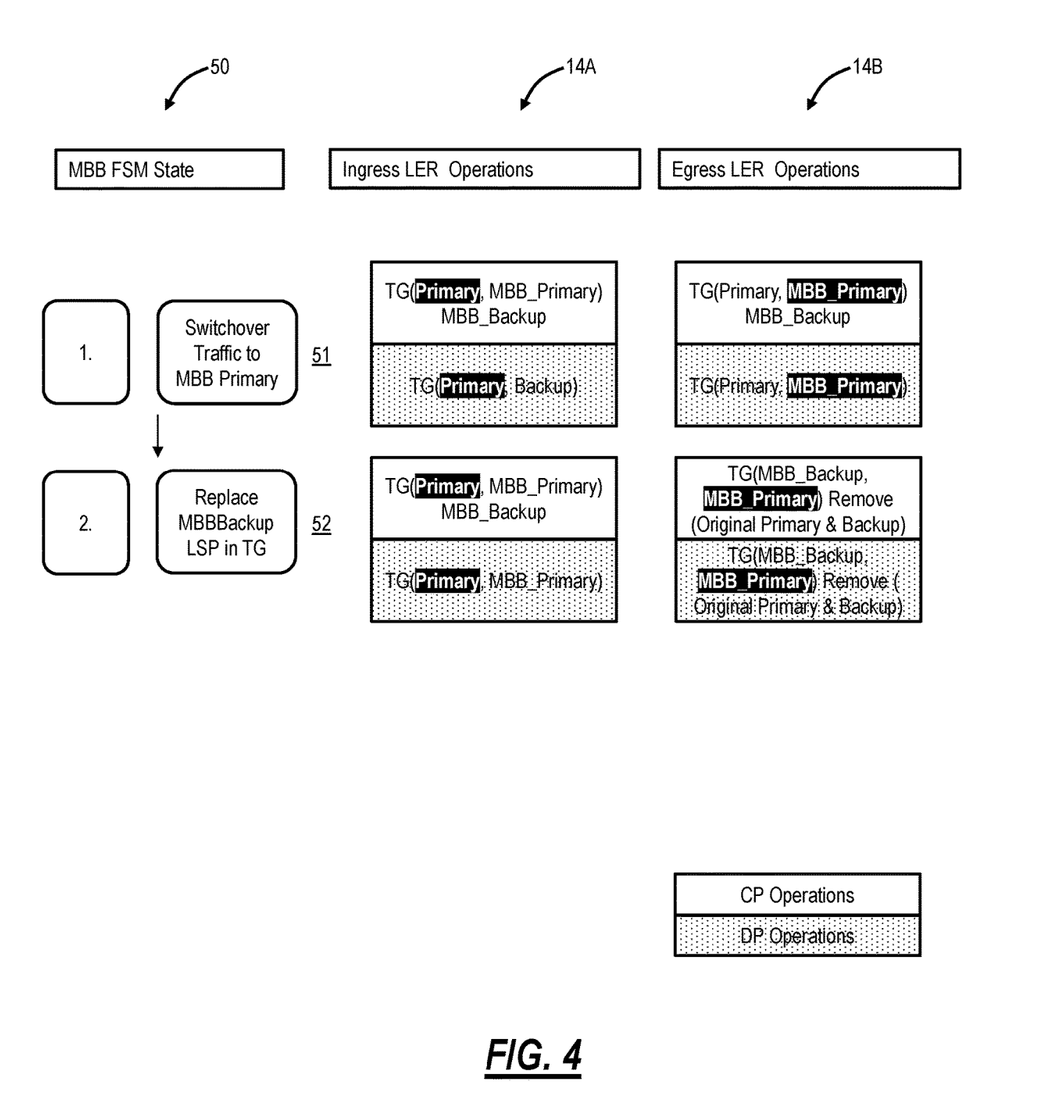
FIG. 4 is a diagram illustrating another MBB FSM process at an ingress LER 14A and an egress LER for replacing a backup LSP in a TG.

FIG. 4 is a diagram illustrating another MBB FSM process 50 at an ingress LER 14A and an egress LER 14B for replacing a backup LSP in a TG. The MBB FSM process 50 begins were the MBB FSM process 30 leaves off with a traffic switchover to an MBB primary tunnel (step 51) and replacement of the MBB Backup LSP in the TG (step 52). Here, in the highlighted situation, there is a traffic hit since the egress LER 14B performs the traffic switchover first and also has removed original LSPs (Primary and Backup) and the ingress LER 14A is still sending traffic on primary LSP and has not switched over to the MBB Primary LSP.

MPLS Network with MBB Modifications

In various embodiment, the systems and methods include modifications to the MBB FSM to ensure a data path is programmed end-to-end prior to any traffic switchover and that the traffic has switched successfully prior to removing any LSPs, to address the first and second issue.

The MPLS network 10 includes a plurality of nodes which include at least a first Label Edge Router (LER) 14A and a second LER 14B; a primary tunnel 20 is created between the first LER 14A and the second LER 14B; a Make Before Break (MBB) tunnel 22 is created between the first LER 14A and the second LER 14B for the primary tunnel 20; prior to switching to the MBB tunnel 22 from the primary tunnel 20, the first LER 14A sends an MPLS request to the second LER 14B via the MBB tunnel 22 and receives an MPLS response from the second LER 14B via the MBB tunnel 22 indicating successfully creation of the MBB tunnel 22; the first LER 14A switches to the MBB tunnel 22 responsive to the successfully creation of the MBB tunnel 22; and, prior to tearing down the primary tunnel 20, the first LER 14A checks statistics of the MBB tunnel 22 to ensure traffic has moved to the MBB tunnel 22 from the primary tunnel 20.

The statistics are checked through a cache of statistics from the primary tunnel 20 prior to the switch, a determination of new statistics for the MBB tunnel 22, and a comparison of the cached statistics with the new statistics to indicate a traffic rate. The traffic has moved to the MBB tunnel 22 from the primary tunnel 20 based on an indication the new statistics have a similar traffic rate to the cached statistics. The statistics are utilized in lieu of Resource Reservation Protocol (RSVP) signaling messages to determine the traffic has moved to the MBB tunnel 22 from the primary tunnel 20.

Process

Figure 5:
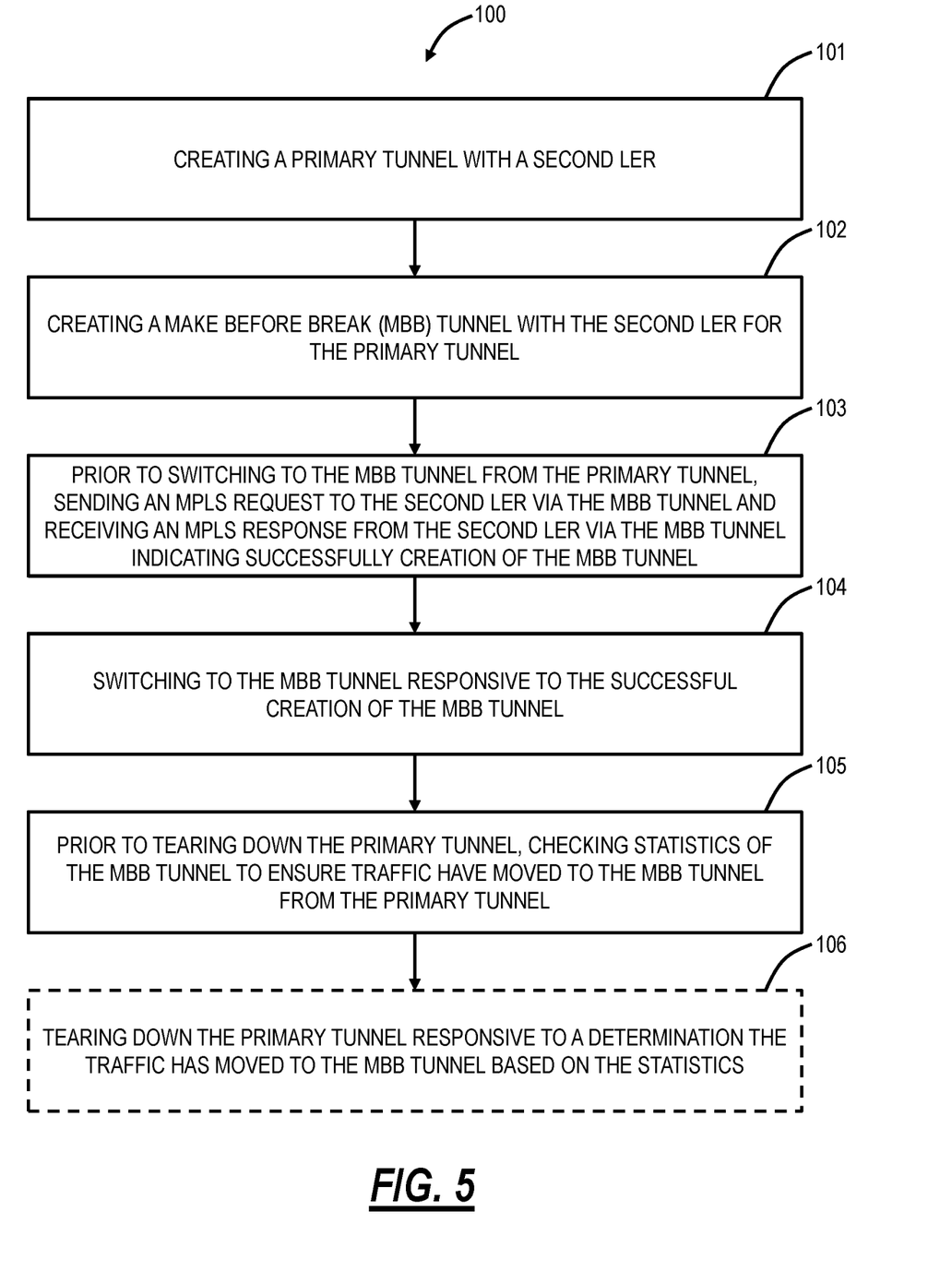
FIG. 5 is a flowchart of a process implemented in a first Label Edge Router (LER) in an MPLS network for modifying the MBB operation to ensure the data path is programmed end-to-end prior to any traffic switchover and that the traffic has switched successfully prior to removing any LSPs.

FIG. 5 is a flowchart of a process 100 implemented in a first Label Edge Router (LER) in a Multiprotocol Label Switching (MPLS) network for modifying the MBB operation to ensure the data path is programmed end-to-end prior to any traffic switchover and that the traffic has switched successfully prior to removing any LSPs. The process 100 addresses both the first issue, utilizing MPLS Operations, Administration, and Maintenance (OAM) mechanisms, and the second issue, utilizing statistics (Performance Monitoring (PM) data) instead of a timer-based approach.

The process 100 includes, in the first LER in the MPLS network, creating a primary tunnel with a second LER (step 101); creating a Make Before Break (MBB) tunnel with the second LER for the primary tunnel (step 102); prior to switching to the MBB tunnel from the primary tunnel, sending an MPLS request to the second LER via the MBB tunnel and receiving an MPLS response from the second LER via the MBB tunnel indicating successfully creation of the MBB tunnel (step 103); switching to the MBB tunnel responsive to the successfully creation of the MBB tunnel (step 104); and, prior to tearing down the primary tunnel, checking statistics of the MBB tunnel to ensure traffic has moved to the MBB tunnel from the primary tunnel (step 105). The process 100 can further include tearing down the primary tunnel responsive to a determination the traffic has moved to the MBB tunnel based on the statistics (step 106). For example, the first LER can be the ingress LER 14A and the second LER can be the egress LER 14B.

The checking statistics can include caching statistics from the primary tunnel prior to the switching, determining new statistics for the MBB tunnel, and comparing the cached statistics with the new statistics to indicate a traffic rate. The traffic has moved to the MBB tunnel from the primary tunnel based on an indication the new statistics have a similar traffic rate to the cached statistics. The cached statistics and the new statistics are received Performance Monitoring (PM) data.

The MPLS request can be an MPLS PING request, and the MPLS response can be an MPLS PING response. The checking statistics can be utilized in lieu of signaling messages between the first LER and the second LER to determine the traffic has moved to the MBB tunnel from the primary tunnel. For example, the checking statistics is utilized in lieu of Resource Reservation Protocol (RSVP) signaling messages. For a DCRT, this checking statistics mechanism removes the handshaking RSVP messages required to synchronize the LERs, namely both ends (LERs) act based on the monitored statistics locally.

Example Operations

Figure 6:
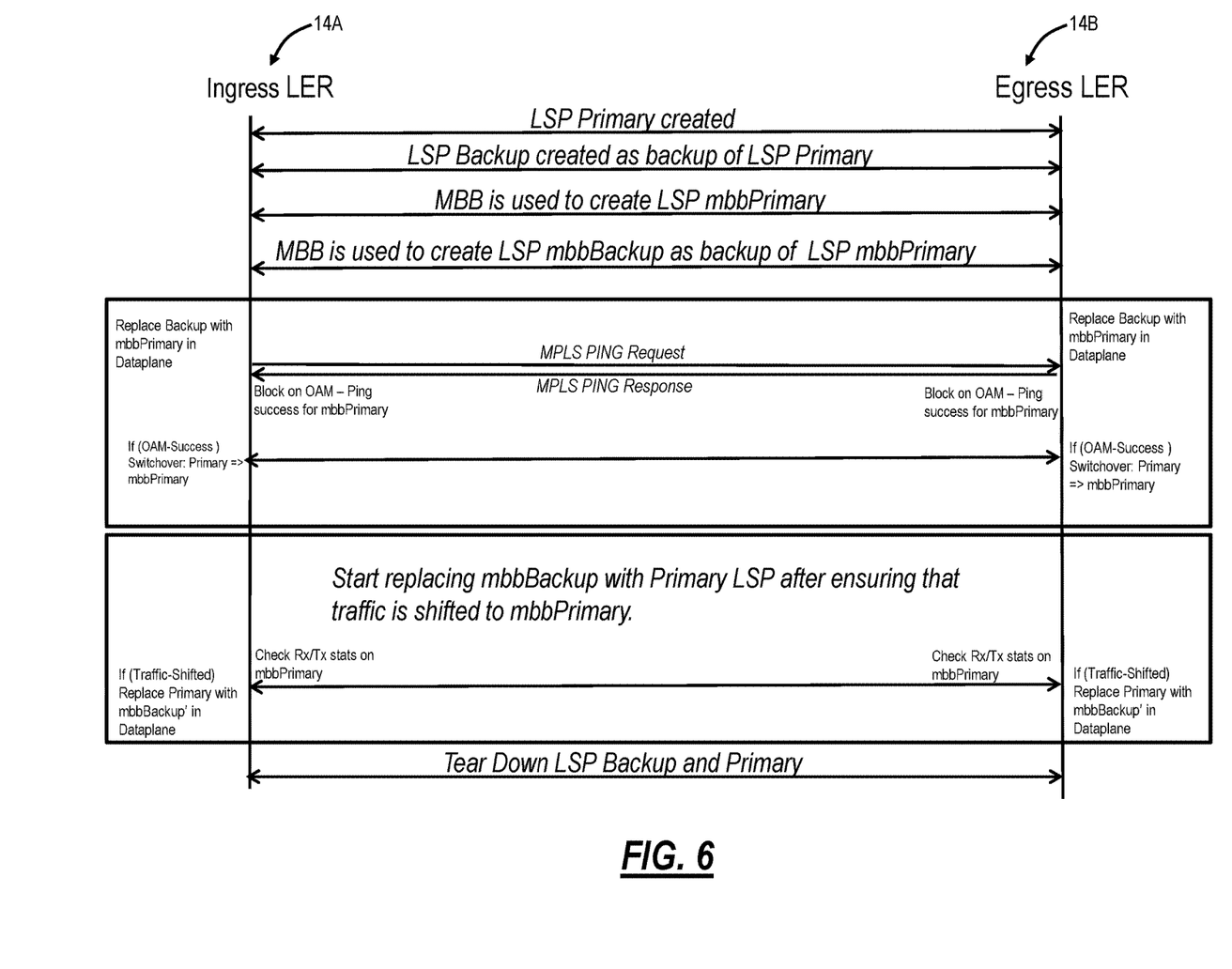
FIG. 6 is a flow diagram of communications between the ingress LER and the egress LER implementing the process for Dynamic Co-Routed (DCRT) LSP.

FIG. 6 is a flow diagram of communications between the ingress LER 14A and the egress LER 14B implementing the process 100 for DCRT. In this embodiment, an LSP primary is created between the LERs 14A, 14B, an LSP backup is created as a backup of the LSP primary, MBB is used to create an LSP referred to as mbbPrimary, to switch the LSP primary to. The process 100 includes PING response/request to ensure the data plane is established, to address the first issue described above. Once the data plane is established, the LSP primary is switched to the mbbPrimary. Next, a new mbbBackup can be replaced with the primary LSP after ensuring that traffic has shifted to the mbbPrimary. As described herein, this includes checking statistics of mbbPrimary to determine the traffic has switched.

Figure 7:
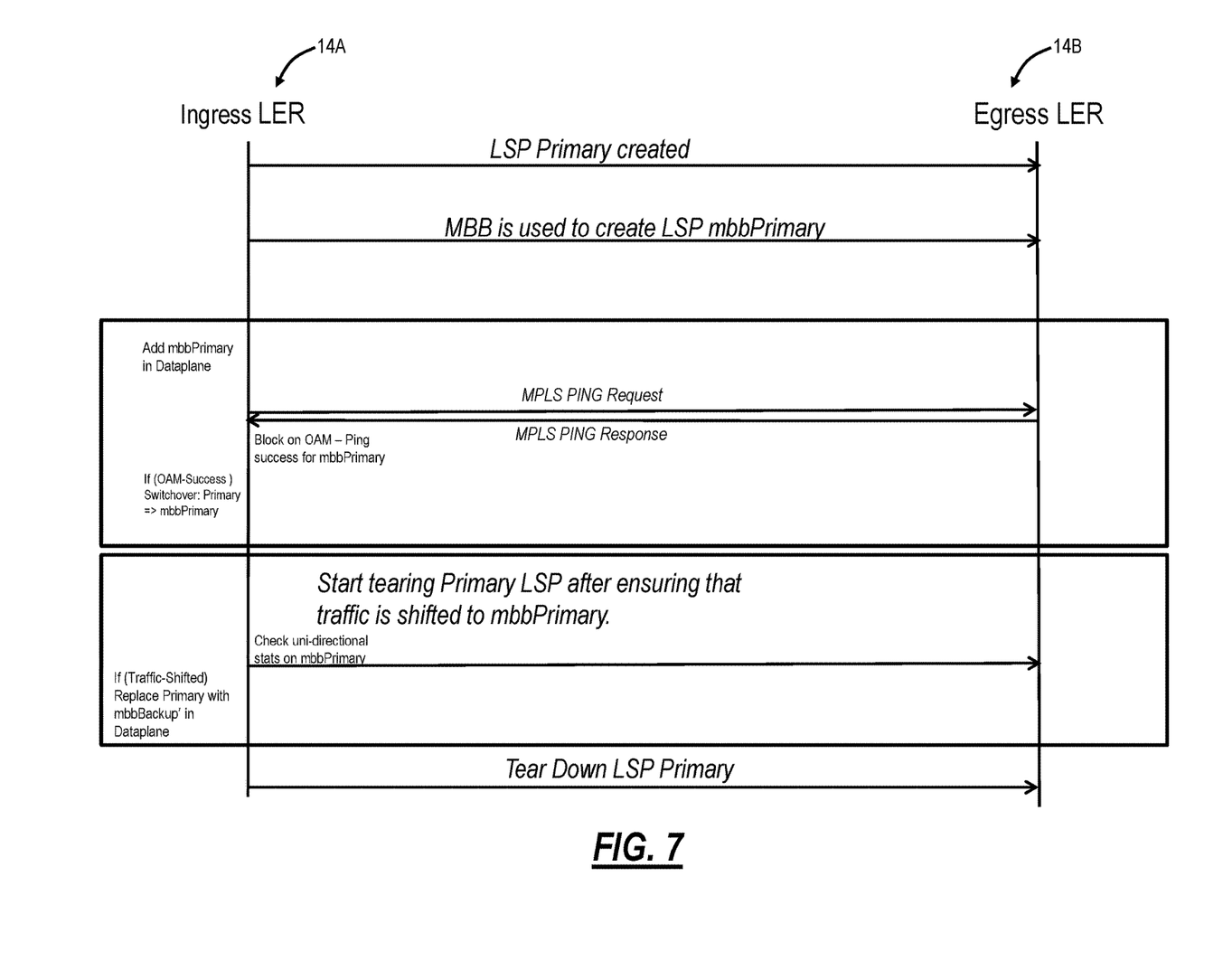
FIG. 7 is a flow diagram of communications between the ingress LER and the egress LER implementing the process for a Uni-Directional LSP (UNI)

FIG. 7 is a flow diagram of communications between the ingress LER 14A and the egress LER 14B implementing the process 100 for a Uni-Directional LSP (UNI). In this embodiment, an LSP primary is created, and MBB is used to create LSP mbbPrimary. The process 100 includes PING response/request to ensure the data plane is established, to address the first issue described above. Once the data plane is established, the LSP primary is switched to the mbbPrimary. Next, the primary LSP can be torn down after ensuring that traffic has shifted to the mbbPrimary. As described herein, this includes checking statistics of mbbPrimary to determine the traffic has switched.

Network Element

Figure 8:
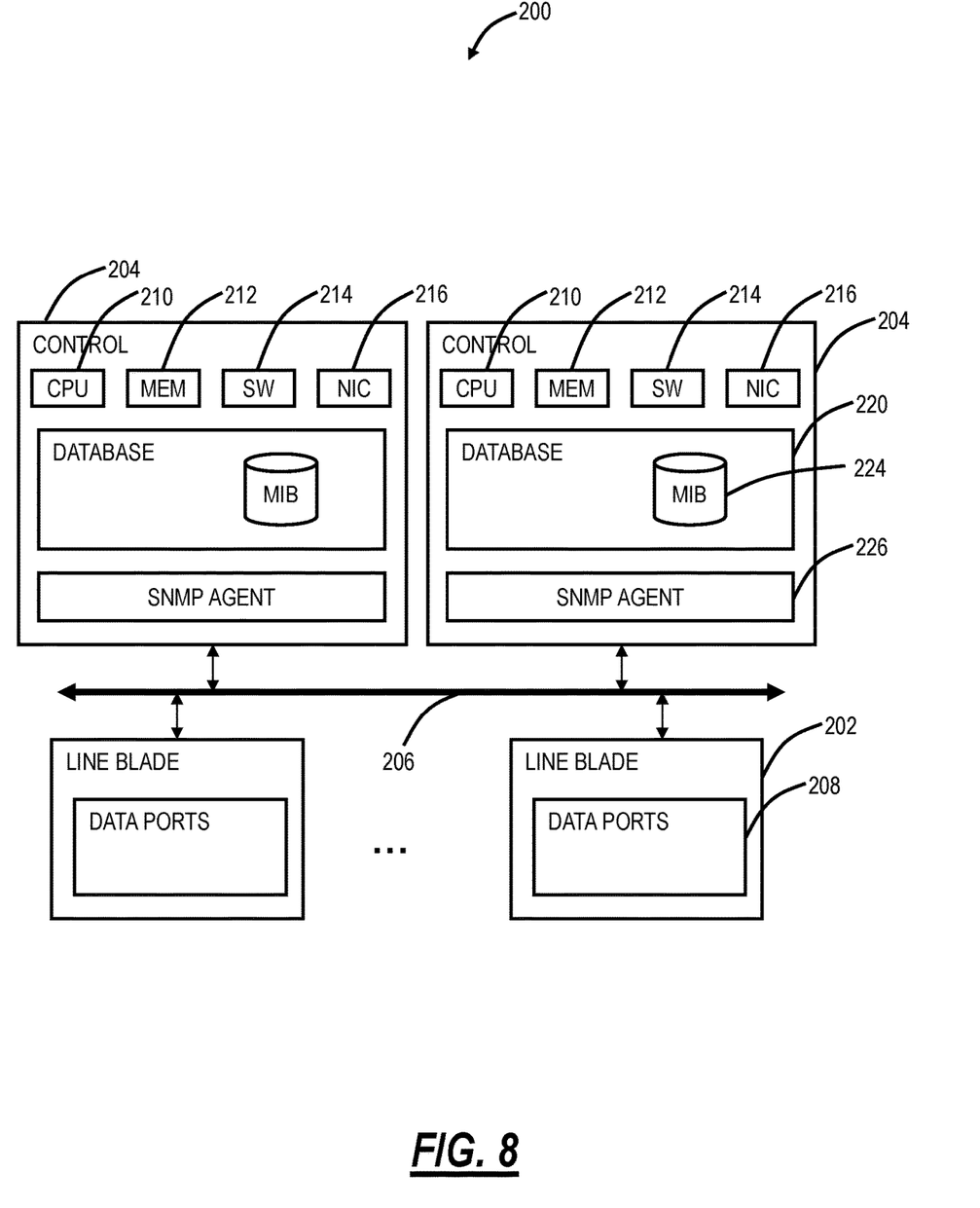
FIG. 8 is a block diagram of an example implementation of a Label Edge Router (LER).

FIG. 8 is a block diagram of an example implementation of a Label Edge Router (LER) $_{14}$. The LER 14 can be an Ethernet network switch for illustration purposes, but those of ordinary skill in the art will recognize the systems and methods described herein contemplate other types of network elements and other implementations. In this embodiment, the LER 14 includes a plurality of blades 202, 204 interconnected via an interface 206. The blades 202, 204 are also known as line cards, line modules, circuit packs, pluggable modules, etc., and generally refer to components mounted within a chassis, shelf, etc. of a data switching device, i.e., the LER 14 Each of the blades 202, 204 may include numerous electronic devices and/or optical devices mounted on a circuit board along with various interconnects including interfaces to the chassis, shelf, etc. Two example blades are illustrated with line blades 202 and control blades 204. The line blades 202 generally include data ports 208 such as a plurality of Ethernet ports. For example, the line blade 202 may include a plurality of physical ports disposed on an exterior of the blade 202 for receiving ingress/egress connections. Additionally, the line blades 202 may include switching components to form a switching fabric via the interface 206 between all of the data ports 208 allowing data traffic to be switched between the data ports 208 on the various line blades 202. The switching fabric is a combination of hardware, software, firmware, etc. that moves data coming into the LER 14 out by the correct port 208 to the next network element. In general, the switching fabric may include switching units, or individual boxes, in a node; integrated circuits contained in the switching units; and programming that allows switching paths to be controlled.

The control blades 204 include a microprocessor 210, memory 212, software 214, and a network interface 216. Specifically, the microprocessor 210, the memory 212, and the software 214 may collectively control, configure, provision, monitor, etc. the network element 200. The network interface 216 may be utilized to communicate with a management system such as a Network Management System (NMS), Element Management System (EMS), and the like. Additionally, the control blades 204 may include a database 220 that tracks and maintains provisioning, configuration, operational data and the like. The database 220 may include a management information base (MIB) 222. Further, the control blades 204 may include a Simple Network Management Protocol (SNMP) Agent 226 configured to operate SNMPv2, SNMPv3, etc. or some other network management communication protocol. In this exemplary embodiment, the network element 200 includes two control blades 204 which may operate in a redundant or protected configuration such as 1:1, 1+1, etc. In general, the control blades 204 maintain dynamic system information including Layer two forwarding databases, protocol state machines, and the operational status of the ports 208 within the network element 200.

In an embodiment, the LER 14A includes a plurality of ports 208, a switching fabric communicatively coupling the plurality of ports 208; and a controller 204 configured to control the plurality of ports 208 and the switching fabric to create of a primary tunnel 20 with a second LER 14B, create a Make Before Break (MBB) tunnel 22 with the second LER 14B for the primary tunnel 20, prior to switching to the MBB tunnel 22 from the primary tunnel 20, send an MPLS request to the second LER 14B via the MBB tunnel 22 and determine reception of an MPLS response from the second LER 14B via the MBB tunnel 22 indicating successfully creation of the MBB tunnel 20; switch to the MBB tunnel 22 responsive to the successfully creation of the MBB tunnel 22; and, prior to tearing down the primary tunnel 20, check statistics of the MBB tunnel 22 to ensure traffic has moved to the MBB tunnel 22 from the primary tunnel 02.

The controller 204 is configured to control the plurality of ports 208 and the switching fabric to tear down the primary tunnel 20 responsive to a determination the traffic has moved to the MBB tunnel 22 based on the statistics. The statistics are checked by the controller 204 through a cache of statistics from the primary tunnel 20 prior to the switch, a determination of new statistics for the MBB tunnel 22, and a comparison of the cached statistics with the new statistics to indicate a traffic rate. The traffic has moved to the MBB tunnel 22 from the primary tunnel 22 based on an indication the new statistics have a similar traffic rate to the cached statistics. The cached statistics and the new statistics are received Performance Monitoring (PM) data. The MPLS request can be an MPLS PING request, and the MPLS response can be an MPLS PING response. The statistics are checked by the controller 204 through instead of signaling messages between the first LER 14A and the second LER 14B to determine the traffic has moved to the MBB tunnel 22 from the primary tunnel 20. The checking statistics is utilized in lieu of Resource Reservation Protocol (RSVP) signaling messages.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method comprising:
in a first Label Edge Router (LER) in a Multiprotocol Label Switching (MPLS) network, creating a primary tunnel with a second LER;
creating a Make Before Break (MBB) tunnel with the second LER for the primary tunnel;
prior to switching to the MBB tunnel from the primary tunnel, sending an MPLS request to the second LER via the MBB tunnel and receiving an MPLS response from the second LER via the MBB tunnel indicating successful creation of the MBB tunnel;
switching to the MBB tunnel responsive to the successful creation of the MBB tunnel; and
prior to tearing down the primary tunnel, checking statistics of the MBB tunnel and the primary tunnel, including a traffic rate of the MBB tunnel and the primary tunnel, to ensure traffic has moved to the MBB tunnel from the primary tunnel, wherein the checking statistics includes caching statistics from the primary tunnel prior to the switching, determining the statistics for the MBB tunnel after switching, and comparing the cached statistics with the statistics for the MBB tunnel to compare the traffic rate of the MBB tunnel with the traffic rate of the primary tunnel in the cached statistics, and wherein the traffic has moved to the MBB tunnel from the primary tunnel based on an indication the traffic rate of the MBB tunnel in the statistics for the MBB tunnel has a similar rate to the traffic rate of the primary tunnel in the cached statistics.

2. The method of claim 1, further comprising:
tearing down the primary tunnel responsive to a determination the traffic has moved to the MBB tunnel based on the statistics.

3. The method of claim 1, wherein the cached statistics from the primary tunnel and the statistics for the MBB tunnel are received Performance Monitoring (PM) data.

4. The method of claim 1, wherein the checking statistics is utilized in lieu of signaling messages between the first LER and the second LER to determine the traffic has moved to the MBB tunnel from the primary tunnel.

5. The method of claim 4, wherein the checking statistics is utilized in lieu of Resource Reservation Protocol (RSVP) signaling messages.

6. A Label Edge Router (LER) comprising:
a plurality of ports;
a switching fabric communicatively coupling the plurality of ports; and
a controller configured to control the plurality of ports and the switching fabric to:
create a primary tunnel with a second LER,
create a Make Before Break (MBB) tunnel with the second LER for the primary tunnel,
prior to switching to the MBB tunnel from the primary tunnel, send an MPLS request to the second LER via the MBB tunnel and determine reception of an MPLS response from the second LER via the MBB tunnel indicating successful creation of the MBB tunnel,
switch to the MBB tunnel responsive to the successful creation of the MBB tunnel, and
prior to tearing down the primary tunnel, check statistics of the MBB tunnel and the primary tunnel, including a traffic rate of the MBB tunnel and the primary tunnel, to ensure traffic has moved to the MBB tunnel from the primary tunnel, wherein the statistics are checked by the controller through a cache of statistics from the primary tunnel prior to the switch, a determination of the statistics for the MBB tunnel after the switch and a comparison of the cached statistics with the statistics for the MBB tunnel to compare the traffic rate of the MBB tunnel with the traffic rate of the primary tunnel in the cached statistics, and wherein the traffic has moved to the MBB tunnel from the primary tunnel based on an indication the traffic rate of the MBB tunnel in the statistics for the MBB tunnel has a similar rate to the traffic rate of the primary tunnel in the cached statistics.

7. The LER of claim 6, wherein the controller is configured to control the plurality of ports and the switching fabric to
tear down the primary tunnel responsive to a determination the traffic has moved to the MBB tunnel based on the statistics.

8. The LER of claim 6, wherein the cached statistics from the primary tunnel and the statistics for the MBB tunnel are received Performance Monitoring (PM) data.

9. The LER of claim 6, wherein the statistics are checked by the controller instead of signaling messages between the first LER and the second LER to determine the traffic has moved to the MBB tunnel from the primary tunnel.

10. The LER of claim 9, wherein the checking statistics is utilized in lieu of Resource Reservation Protocol (RSVP) signaling messages.

11. A Multiprotocol Label Switching (MPLS) network comprising:

a plurality of nodes which include at least a first Label Edge Router (LER) and a second LER;

wherein a primary tunnel is created between the first LER and the second LER;

wherein a Make Before Break (MBB) tunnel is created between the first LER and the second LER for the primary tunnel;

wherein, prior to switching to the MBB tunnel from the primary tunnel, the first LER sends an MPLS request to the second LER via the MBB tunnel and receives an MPLS response from the second LER via the MBB tunnel indicating successful creation of the MBB tunnel;

wherein the first LER switches to the MBB tunnel responsive to the successful creation of the MBB tunnel;

wherein, prior to tearing down the primary tunnel, the first LER checks statistics of the MBB tunnel and the primary tunnel, including a traffic rate of the MBB tunnel and the primary tunnel, to ensure traffic has moved to the MBB tunnel from the primary tunnel;

wherein the statistics are checked through a cache of statistics from the primary tunnel prior to the switch, a determination of the statistics for the MBB tunnel after the switch and a comparison of the cached statistics with the statistics for the MBB tunnel to compare the traffic rate of the MBB tunnel with the traffic rate of the primary tunnel in the cached statistics; and wherein the traffic has moved to the MBB tunnel from the primary tunnel based on an indication the traffic rate of the MBB tunnel in the statistics for the MBB tunnel has a similar rate to the traffic rate of the primary tunnel in the cached statistics.

12. The MPLS network of claim 11, wherein the primary tunnel is torn down responsive to a determination the traffic has moved to the MBB tunnel based on the statistics.

13. The MPLS network of claim 11, wherein the cached statistics from the primary tunnel and the statistics for the MBB tunnel are received Performance Monitoring (PM) data.

14. The MPLS network of claim 11, wherein the statistics are utilized in lieu of Resource Reservation Protocol (RSVP) signaling messages to determine the traffic has moved to the MBB tunnel from the primary tunnel.

* * * * *